United States Patent [19]

Haddad

[11] Patent Number: 4,475,728

[45] Date of Patent: Oct. 9, 1984

[54] TOGGLE ACTUATED BENCH CLAMP

[76] Inventor: Arthur K. Haddad, 139 Everglades Ave., Palm Beach, Fla. 33480

[21] Appl. No.: 394,427

[22] Filed: Jul. 1, 1982

[51] Int. Cl.[3] .............................................. B23Q 3/02

[52] U.S. Cl. ...................................... 269/94; 269/228; 269/239

[58] Field of Search .................... 269/228, 91, 239, 93, 269/94, 96; 81/418, 421, 422, 423, 424

[56] References Cited

U.S. PATENT DOCUMENTS

| | | | |
|---|---|---|---|
| 128,902 | 7/1872 | Pinkham | 269/239 X |
| 873,077 | 12/1907 | Patnod | 269/239 X |
| 2,777,347 | 1/1957 | Sendoykas | 269/94 X |
| 2,825,525 | 3/1958 | Kellam | 269/239 X |
| 3,124,347 | 3/1964 | Haddad | 269/91 |
| 3,229,554 | 1/1966 | Haddad | 81/367 |
| 3,446,102 | 5/1969 | Hallmark | 81/422 X |

*Primary Examiner*—Frederick R. Schmidt
*Assistant Examiner*—Steven P. Schad
*Attorney, Agent, or Firm*—Charles R. Fay

[57] ABSTRACT

A toggle actuated bench clamp including an elongated bar mounted on a swivel plate and having a fore and aft motion and an up and down motion but being constricted by said toggle actuated bench clamp, and a toggle mechanism to force one end of the bar down to clamp, the other end of the bar resting on a fulcrum point, or the like, rising from the top surface of the swivel plate. The swivel plate may be mounted on a table or bench.

2 Claims, 2 Drawing Figures

TOGGLE ACTUATED BENCH CLAMP

BACKGROUND OF THE INVENTION

Applicant is the inventor-owner of U.S. Pat. Nos. 3,124,347 and 3,229,554, which are a part of the prior art and utilize parts of the well-known Peterson "Vice Grip", as does the present invention. Although these patents use the name "Vice Grip", this has been changed to a more descriptive "grip actuated toggle clamp". Whereas the patents, as well as the Peterson "Vice Grip", use a jaw of the latter as a hold down, the present invention is an improvement on the patented structures through the addition of a bar or lever with a fulcrum that is clamped and/or unclamped by a novel member replacing the hold down jar for greater versatility.

SUMMARY OF THE INVENTION

A swivel plate is mounted on table bench with means to adjustably fix the same in desired position. A U-shaped bridge opening upwardly is fixed to the plate which has an inverted V shaped fulcrum along one edge transverse to a bar or lever passing through the bridge, being loosely mounted therein and resting on the fulcrum. This bar or lever is the hold down as respects the table or bench top surface.

A pivot stud is mounted on the two arms of the bridge adjacent the top opening thereof and this pivots a hold down arm actuated between clamping and releasing positions of a toggle actuated clamping mechanism of the type of the Peterson "Vice Grip". The hold down arm has a free nose terminal portion that bears on the top of the bar or lever and causes it to clamp down onto the table or bench. It releases as does the "Vice Grip", and a connection between the hold down arm and the bar or lever can be provided to cause the latter to rise from the workup release for faster work. The clamping end of the bar or lever is preferably bent up slightly to make the clamping end thereof parallel to the table or bench top, and various configurations may be employed for various types of work.

The clamping action is very versatile. The bar or lever is adjustably placed longitudinally as desired relative to the plate and bridge, and the plate carrying the bridge is swiveled.

PREFERRED EMBODIMENT OF THE INVENTION

Figure 2:
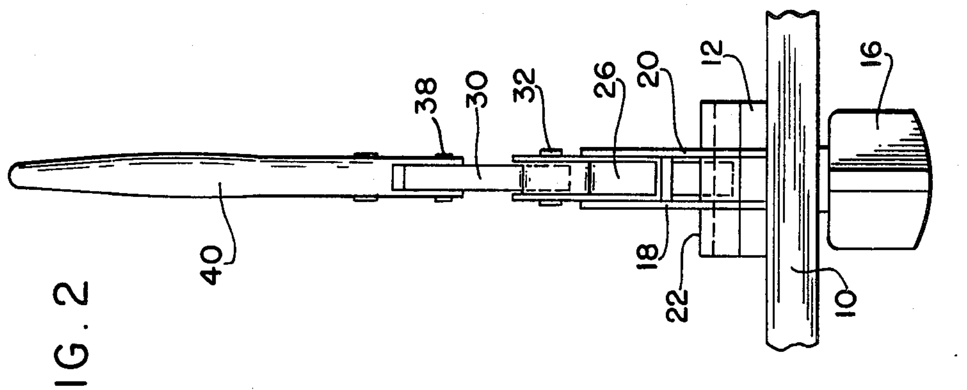
FIG. 2 is an end elevational view thereof looking in the direction of arrow 2 in FIG. 1.
Figure 1:
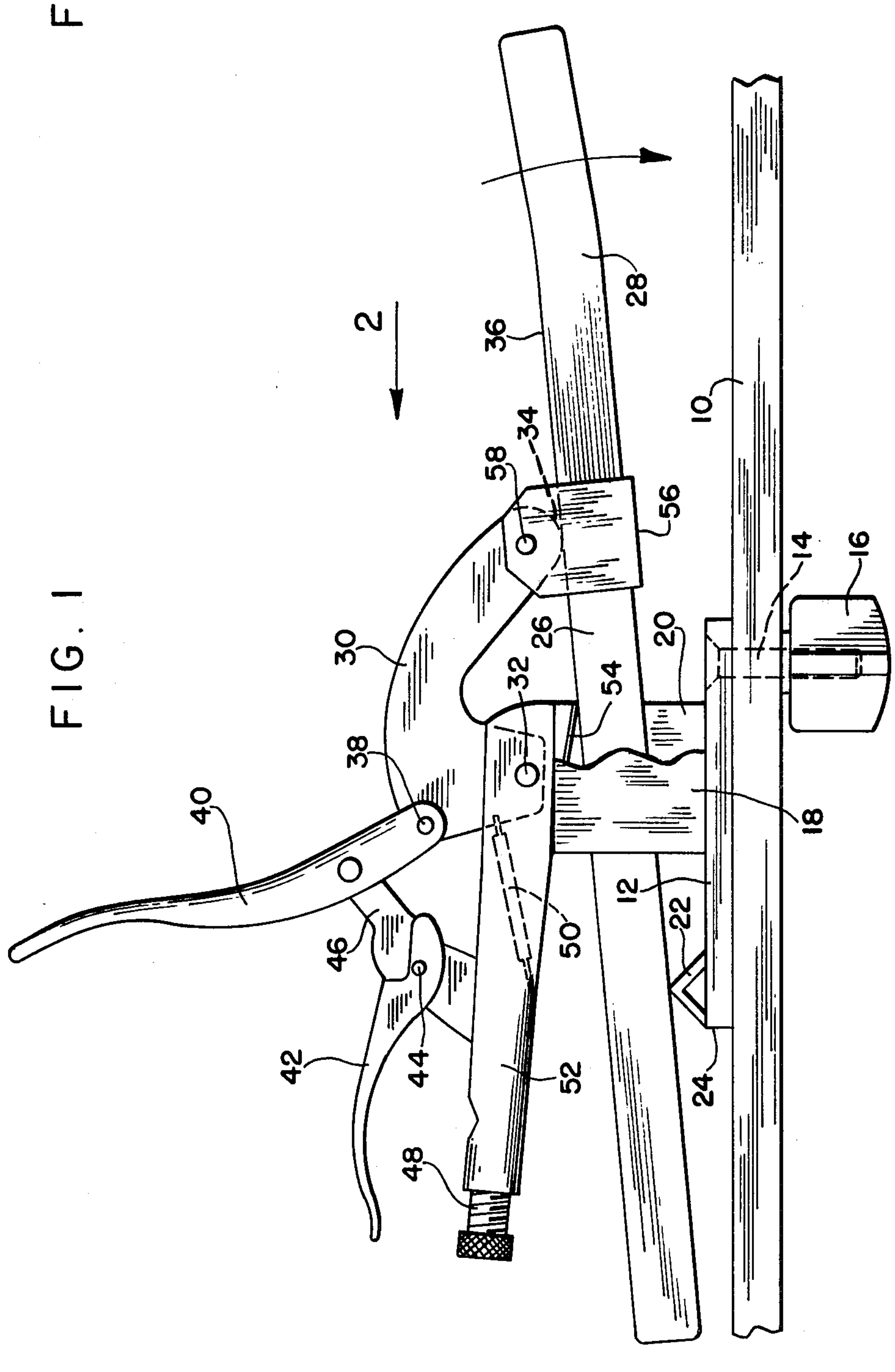
FIG. 1 is a view in side elevation of the clamp.

The numeral 10 indicates a table or bench top on which a plate 12 is swivelly mounted by a threaded pin 14 having a hand actuated nut 16 to clamp the plate in fixed relation to the table or bench or to release it to swivel to another position to be clamped in the new position. A pair of spaced upright parallel plates 18,20 are fixed on the plate 12, and an inverted V shape fulcrum 22 is fixed to the plate at its rear edge 24. The bridge provides a support for the toggle mechanism to be described and a loose guide for an elongated bar or lever 26. The bar or lever 26 rests and rides on the fulcrum and is pressed down by the toggle to clamp an object against the top of the table or bench. The clamping end portion of the bar or lever 26 is preferably bent up as at 28 to contact the table or bench top flatly, or nearly so, with no object clamped.

A hold down arm 30 has a kind of boomerang shape, being pivoted to the top portion of the bridge at 32 at what may be considered one end of the boomerang, the other end thereof terminating in a rounded hold down nose 34 bearing on the top edge 36 of bar or lever 26. At an intermediate point on the hold down arm there is a pivot 38 to the lever-handle 40 of the toggle mechanism. The lever-handle 40 has a release handle 42 pivoted at 44 to the adjustment arm 46 of the toggle, the arm 46 being adjusted by screw 48, and the usual spring 50 is used, the screw 48 and spring 50 being housed in fixed lever 52, secured at its forward end to the bridge at its top.

The parts of the toggle will be easily recognized as derived from the Peterson "Vice Grip" but the hold down arm 30 is very different from the usual upper jaw of the toggle clamp, and is made to act somewhat in the nature of the upper jaw of a Peterson "Vice Grip", or jaw 10 in applicant's prior patents. The hold down arm herein does not contact the work; this is done by the bar or lever 26, especially at the area 28. A member 54, fixed to arm 52, acts as a stop for the bar or lever 26.

As thus far described, an object to be clamped is placed on the table or bench and the handle 40 is moved counterclockwise, causing hold down arm 30 to move clockwise and push down on bar or lever 26, clamping the object with varing degrees of force depending on the actuation of screw 48. The reverse motion releases the object but does not raise bar or lever 26 which remains resting on the object at one end (28) and on the fulcrum 22 at the other end. However, to lift bar or lever 26, it is only necessary to provide a U-shaped lifter 56, e.g. pivoted at 58 to the nose of the hold down arm and encompassing bar or lever 26 to provide a lifter for the latter so that higher speed production is possible; i.e., in a drill press.

The table or bench 10 can be a planer table or the like and T-head bolts can be used to hold the plate 12; various special shapes, etc. can be applied to the bar or lever 26, e.g. T-shaped hold downs, and those shaped to the work in a case of production. Drill guide bushings and other appurtenances may also be used as will be apparent to a machine tool designer.

I claim:

1. A toggle actuated bench clamp comprising a swivel plate, an upright on the plate, a hold down arm pivoted with respect to the upright at a point removed from the plate, a toggle actuated device associated with the hold down arm to cause the latter to pivot downwardly, and including means to release the hold down arm, said upright including guide means, an elongated bar loosely held in the guide means, the bar and hold down arm being coplanar vertically, the bar being located beneath the hold down arm so that the arm forces the bar downwardly when the toggle is actuated to move the hold down arm down, said bar being free for longitudinal adjustment when released, and having a clamping end and an opposite free end, the hold down arm being adjacent the clamping end of the bar, the plate being adapted to be mounted on a bench or table, and the clamping end of the bar extending outwardly beyond the plate, clamping an object to the bench or table, a fulcrum on the plate upon which the free end of the bar rests, the fulcrum and the clamping end of the bar being at opposed aspects of the upright.

2. The bench clamp of claim 1 wherein the fulcrum extends above the top surface of the plate, the free end portion of the bar resting on the fulcrum at one aspect of the upright and the clamping end of the hold down arm being located at the opposite aspect of the upright.

* * * * *